Patented Dec. 7, 1926.

1,609,591

UNITED STATES PATENT OFFICE.

JAMES F. WHITE, OF WESTFIELD, TEXAS, ASSIGNOR OF ONE-HALF TO H. M. HOBBS, OF WESTFIELD, TEXAS.

COMPOSITION OF MATTER.

No Drawing.    Application filed September 15, 1923.    Serial No. 662,981.

This invention relates to a new and useful composition of matter.

One object of my invention is to produce a mouth wash composed of ingredients combined in a novel manner.

Another object of the invention resides in the production of a novel composition of ingredients which may be readily obtained and combined so as to produce a cheap, effective and easily obtainable oral application.

My composition consists of honey, alum, borax, and extract of the fern *Polypodium polypodioides*.

In preparing the composition I prefer to use the ingredients in about the following proportions, viz: One third of one per cent pure honey, one sixth of one per cent of alum, one-twelfth of one per cent of borax, and ninety-nine and five-twelfths per cent of the extract of the fern *Polypodium polypodioides*.

These ingredients are mixed so as to form a liquid mixture and are to be used as a mouth wash. In use, about one tablespoonful is sufficient for each treatment, and should be held in the mouth about five minutes so as to reach all of the affected parts. The remedy should be applied preferably about twice daily.

The honey acts as a stimulant and stimulates the circulation through the affected parts; alum is an antiseptic and astringent and has certain healing properties; the borax is a mild antiseptic and when mixed with the alum modifies the same so that it will not be too severe, while the *Polypodium polypodioides* is a very effective germicide. All these ingredients act together to stimulate and heal the affected parts and act as an effective antiseptic.

What I claim is:

1. A mouth wash formed by mixing honey, alum, borax and an extract of the fern *Polypodium polypodioides*.

2. A mouth wash consisting of approximately $\frac{1}{3}$ of one per cent of pure honey, $\frac{1}{6}$ of one per cent of alum, $\frac{1}{12}$ of one per cent of borax and $99\frac{5}{12}$ per cent of the extract of the fern *Polypodium polypodioides*.

In testimony whereof I have signed my name to this specification.

JAMES F. WHITE.